(12) United States Patent
Rodoni (10) Patent No.: US 11,068,830 B2
(45) Date of Patent: Jul. 20, 2021

(54) WASTE MANAGEMENT SYSTEM HAVING UNSCHEDULED STOP MONITORING

(71) Applicant: Rubicon Global Holdings, LLC, Altanta, GA (US)

(72) Inventor: Philip Rodoni, Decatur, GA (US)

(73) Assignee: Rubicon Technologies, LLC, Atlanta, GA (US)

(*) Notice: Subject to any disclaimer, the term of this patent is extended or adjusted under 35 U.S.C. 154(b) by 82 days.

(21) Appl. No.: 15/185,404

(22) Filed: Jun. 17, 2016

(65) Prior Publication Data

US 2016/0379152 A1     Dec. 29, 2016

Related U.S. Application Data

(60) Provisional application No. 62/315,407, filed on Mar. 30, 2016, provisional application No. 62/306,515, (Continued)

(51) Int. Cl.
*G06Q 10/06* (2012.01)
*G01C 21/34* (2006.01)
(Continued)

(52) U.S. Cl.
CPC ... *G06Q 10/06398* (2013.01); *G01C 21/3476* (2013.01); *G06Q 10/063114* (2013.01);
(Continued)

(58) Field of Classification Search
None
See application file for complete search history.

(56) References Cited

U.S. PATENT DOCUMENTS

| 4,868,796 A | 9/1989 | Ahrens et al. |
| 5,014,206 A * | 5/1991 | Scribner ........ G07C 5/008 |
| | | 701/517 |

(Continued)

FOREIGN PATENT DOCUMENTS

JP    2000233804 A  *  8/2000  .......... B65F 9/00

OTHER PUBLICATIONS

Tran et al. Waste Management System Using IoT—Based Machine Learning in University. Wireless Communications and Mobile Computing. Feb. 27, 2020. https://www.hindawi.com/journals/wcmc/2020/6138637/ (Year: 2020).*

(Continued)

*Primary Examiner* — Patricia H Munson
*Assistant Examiner* — Nancy N Prasad
(74) *Attorney, Agent, or Firm* — Rock IP, PLLC (57) ABSTRACT

A system is disclosed for managing services of a service vehicle. The system may have a locating device configured to generate a first signal indicative of a location of the service vehicle, and at least one sensor configured to generate a second signal indicative of a waste service being completed by the service vehicle. The system may further have a computing device in communication with the locating device and the at least one sensor. The computing device may be configured to receive a route assignment including waste services to be performed by the service vehicle at a plurality of target locations, and to make a determination that the service vehicle has stopped at a non-target location based on the plurality of target locations and at least one of the first and second signals. The computing device may further be configured to selectively generate an electronic response based on the determination.

21 Claims, 7 Drawing Sheets

Related U.S. Application Data filed on Mar. 10, 2016, provisional application No. 62/299,183, filed on Feb. 24, 2016, provisional application No. 62/183,454, filed on Jun. 23, 2015.

(51) Int. Cl.
*H04W 4/024* (2018.01)
*G06Q 10/00* (2012.01)
*G06Q 50/10* (2012.01)

(52) U.S. Cl.
CPC ............ *G06Q 10/30* (2013.01); *H04W 4/024* (2018.02); *G06Q 50/10* (2013.01); *Y02P 90/80* (2015.11)

(56) References Cited

U.S. PATENT DOCUMENTS

| | | |
|---|---|---|
| 5,489,898 A | 2/1996 | Shigekusa et al. |
| 6,124,810 A | 9/2000 | Segal et al. |
| 6,729,540 B2 | 5/2004 | Ogawa |
| 7,246,009 B2 | 7/2007 | Hamblen et al. |
| 7,412,307 B2 | 8/2008 | Pillar et al. |
| 7,624,024 B2 | 11/2009 | Levis et al. |
| 2003/0191580 A1* | 10/2003 | Endo ................ G08G 1/096883 701/420 |
| 2006/0178812 A1 | 8/2006 | Affleck et al. |
| 2008/0077541 A1* | 3/2008 | Scherer ................ G06Q 30/04 705/400 |

OTHER PUBLICATIONS

Nuortio et al., Improved route planning and scheduling of waste collection and transport.; Expert System with Applications ; pp. 223-232; 2005.

Sahoo et al., Routing Optimization for Waste Management; Interfaces pp. 24-36; 2005.

International Search Report based on International Application No. PCT/US2016/038473.

* cited by examiner

ARRIVED
BIG J COFFEE

REPORT A PROBLEM 850

○ RECEPTACLE NOT FOUND
◉ RECEPTACLE INACCESSIBLE
○ OTHERS

SUBMIT

ARRIVED
BIG J COFFEE

PICKUP WEIGHT: 30 LB

UPDATE RECORD | OVERWRITE PICKUP WEIGHT | REPORT A PROBLEM

WASTE MANAGEMENT SYSTEM HAVING UNSCHEDULED STOP MONITORING

RELATED APPLICATIONS

This application is based on and claims priority to U.S. Provisional Application Nos. 62/183,454 filed on Jun. 23, 2015; 62/299,183 filed on Feb. 24, 2016; 62/306,515 filed on Mar. 10, 2016; and 62/315,407 filed on Mar. 30, 2016, the contents of all of which are expressly incorporated herein by reference.

TECHNICAL FIELD

The present disclosure relates generally to a management system and, more particularly, to a waste management system having unscheduled stop monitoring.

BACKGROUND

Commercial and residential waste service providers typically dispatch service vehicles to customer properties according to a predetermined pickup schedule assigned to each service vehicle. The pickup schedule for each service vehicle is often designed to provide services within a particular geographical area and at a particular frequency (e.g., once per week). Customers that subscribe to these waste removal services are billed on a periodic basis (e.g., monthly, quarterly, etc.) for their subscription. In order for the waste removal service providers to be efficient and profitable, it may be important for each service vehicle in the provider's fleet to visit each subscribing customer on the assigned route in a particular order and within a particular time frame, and to pick up waste from only the subscribing customers.

In some instances, it may be possible for the service vehicles to stop at locations that are not on assigned routes and/or to pick up waste from non-subscribing entities. For example, due to changing route assignments, changing vehicle drivers, drivers having different levels of experience, discontinued customer subscriptions, new customer subscriptions, etc., it may be possible for a driver to erroneously stop a service vehicle and/or to perform unbillable waste removal services at an incorrect address. In another example, the driver may purposely interrupt the assigned route and cause the vehicle to stop at a non-customer location (e.g., the driver may stop to get lunch, to perform waste removal services as a favor for a non-customer, etc.). In yet another example, the route of a particular vehicle may be interrupted by the service provider (e.g., via a dispatch call), in order to request service of an on-demand customer not normally on the assigned route. Finally, environmental factors (e.g., traffic congestion, weather, road conditions, etc.) may cause the driver to stop at a non-customer location. In any of these instances, the unscheduled stop may not be accounted for financially and could cause delays associated with completion of the assigned route. Current technology fails to provide a way to officially monitor or respond to these activities.

The disclosed system is directed to overcoming one or more of the problems set forth above and/or other problems of the prior art.

SUMMARY

In one aspect, the present disclosure is directed to a system for managing waste services performed by a service vehicle. The system may include a locating device disposed onboard the service vehicle that is configured to generate a first signal indicative of a location of the service vehicle. The system may also include at least one sensor disposed onboard the service vehicle that is configured to generate a second signal indicative of a waste service being completed by the service vehicle. The system may further include a computing device in communication with the locating device and the at least one sensor. The computing device may be configured to receive a route assignment including waste services to be performed by the service vehicle at a plurality of target locations, and to make a determination that the service vehicle has stopped at a non-target location based the plurality of target locations and based on at least one of the first signal and the second signal. The computing device may further be configured to selectively generate an electronic response based on the determination.

In another aspect, the present disclosure is directed to a method for managing waste services performed by a service vehicle. The method may include generating a first signal indicative of a location of the service vehicle, and generating a second signal indicative of a waste service being completed by the service vehicle. The method may also include determining a route assignment including waste services to be performed by the service vehicle at a plurality of target locations, and making a determination that the service vehicle has stopped at a non-target location based on the plurality of target locations and based on at least one of the first signal and the second signal. The method may further include selectively generating an electronic response based on the determination.

In yet another aspect, the present disclosure is directed to a non-transitory computer readable medium containing computer-executable programming instructions for performing a method of waste management by a service vehicle. The method may include generating a first signal indicative of a location of the service vehicle, and generating a second signal indicative of a waste service being completed by the service vehicle. The method may also include determining a route assignment including waste services to be performed by the service vehicle at a plurality of target locations, and determining that the service vehicle has stopped at a non-target location based on the first signal and the plurality of target locations. The method may further include determining, based on the second signal, that a waste service has been performed at the non-target location while the service vehicle is stopped, and selectively generating an electronic response based on performance of the waste service.

DETAILED DESCRIPTION

Figure 1:
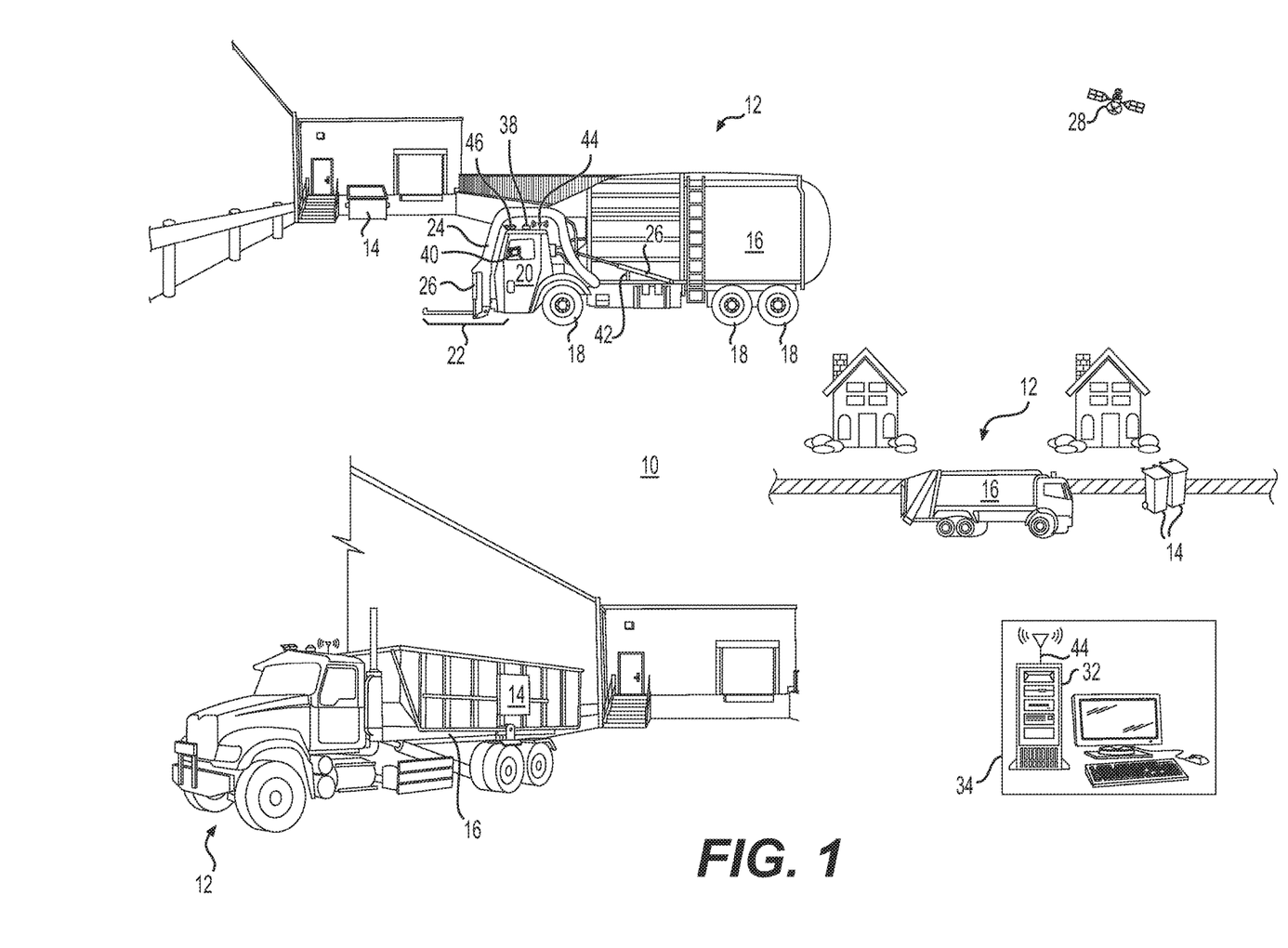
FIG. 1 is an diagrammatic illustration of an exemplary disclosed waste management environment.

FIG. 1 illustrates an exemplary waste management environment ("environment") 10, at which multiple service vehicles 12 are providing services for different customers.

Environment 10 may include a retail store, a factory, a government building, a residential address, and/or another location having one or more receptacles 14 that require the services provided by service vehicles 12. The services may include, for example, the removal of waste materials from receptacle(s) 14, the replacement of receptacle(s) 14, and/or the placement of additional receptacles 14.

Service vehicles 12 may take many different forms. In the upper-left example of FIG. 1, service vehicle 12 is a hydraulically actuated, front-loading type of service vehicle. Specifically, service vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise lift arms 24 (and receptacle 14) up past cab 20 to a dump location over bed 16. After dumping receptacle 14, pressurized oil may be released from hydraulic actuator(s) 26 to allow lowering of lift arms 24 and receptacle 14 back to the ground in front of service vehicle 12.

In other examples (e.g., shown on the right in FIG. 1), service vehicle 12 may be located to automatically pick up receptacles 14 from a side and/or a rear of each service vehicle 12. In these same examples, receptacles 14 could additionally or alternatively be manually lifted and dumped into bed 16. In a final example, (e.g., shown in the lower-left of FIG. 1), service vehicle 12 may be configured to load receptacle 14 onto service vehicle 12 for transportation away from environment 10. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

As each service vehicle 12 moves about environment 10, a satellite 28 or other tracking device may communicate with an onboard controller 30 (shown only in FIG. 2) to monitor the movements of service vehicle 12 and the associated changes made to environment 10 (e.g., pickup, dumping, placement, etc.). As will be explained in more detail below, onboard controller 30, or a separate offboard controller 32 (e.g., a controller 32 located in a back office 34 or other service facility), may then manage future operations of service vehicle 12 (and other similar service vehicles 12) based on these movements and changes.

Both of onboard and offboard controllers 30, 32 may be considered computing devices that include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
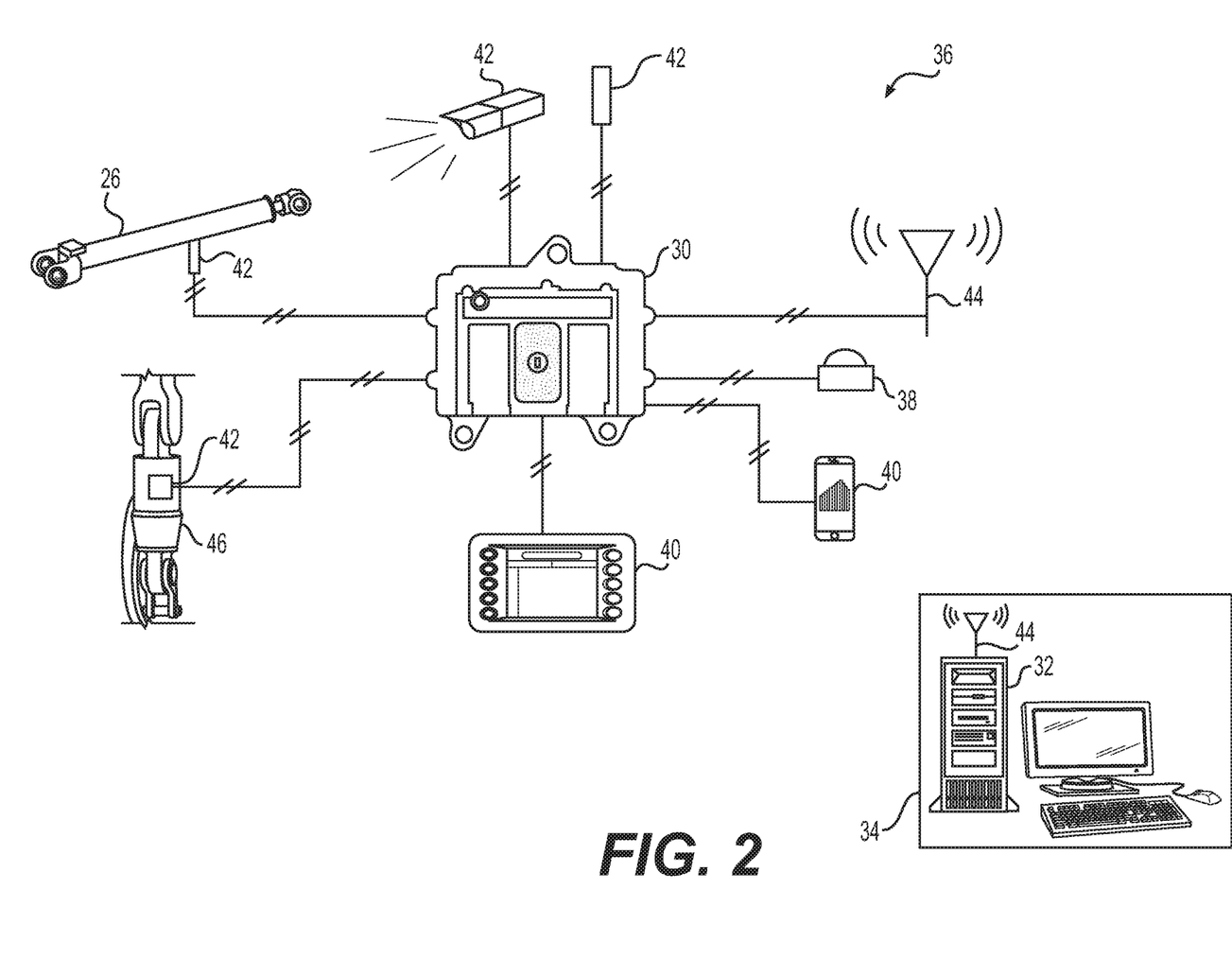
FIG. 2 is a schematic illustration of an exemplary disclosed system that may be used to manage the environment of FIG. 1.

As shown in FIG. 2, onboard controller 30 may form a portion of a waste management system ("system") 36 that is configured to track, assist, and/or control movements of service vehicle(s) 12 (referring to FIG. 1). In addition to onboard controller 30, system 36 may also include a locating device 38, and at least one of a manual input device 40 and a sensor 42 mounted or otherwise located onboard each service vehicle 12. In some embodiments, system 36 includes both manual input device 40 and one or more sensors 42. In other embodiments, sensor 42 (and/or controller 30) may be internal to input device 40. Onboard controller 30 may be in communication with each of these other components and/or with offboard controller 32 at back office 34 (e.g., via a communication device 44), and configured to determine, based on signals from these components and based on other known information stored in memory, the location of each service vehicle 12 and characteristics and locations of receptacles 14 being moved by and/or in a vicinity of each service vehicle 12.

Locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of service vehicle 12, for example of lift arms 24 (shown only in FIG. 1). Based on the signals generated by locating device 38 and based on known kinematics of service vehicle 12, onboard controller 30 may be able to determine in real time the position, heading, travel speed, acceleration, and orientation of service vehicle 12 and lift arms 24. This information may then be used by onboard and/or offboard controllers 30, 32 to update the locations and conditions of service vehicles 12 and/or receptacles 14 in an electronic map or database of environment 10.

It is contemplated that locating device 38 may take another form, if desired. For example, locating device 38 could be an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or the other indicia, the location and/or orientation of service vehicle 12 may be determined.

Input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a type and/or condition of receptacle 14, a location of receptacle 14, and or other information about the receptacle and waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, payload information (e.g., weight and/or volume), questions, etc.

In some embodiments, input device 40 may be configured to execute an application. For example, when input device 40 is a mobile device (for example a smartphone or tablet), the application can be a mobile app ("app"). The app can provide a graphical user interface (GUI) that displays information about a waste handling operation to an operator; and that receives input from the operator used to configure acquisition of operational data by sensor(s) 42, to transmit the operational data to controllers 30, 32, to receive and display information about a current operation (e.g., as monitored by sensor(s) 42), etc.

Sensors 42 may be configured to monitor parameters associated with the waste material loaded into service vehicle 12 and/or the associated receptacles 14 being moved by service vehicle 12 (e.g., moved by lift arms 24), and to generate corresponding signals indicative thereof. Each of these sensors 42 may be any type of device known in the art, and located anywhere on or in service vehicle 12. In one example, sensor 42 may embody a lift sensor, such as any one or more of a load cell, a force gauge, a pressure sensor, a motion sensor, or another type of lift sensor associated directly with lift arms 24, with actuator(s) 26, with receptacle 14, and/or with a strut 46 supporting bed 16. In this example, the signals generated by sensor(s) 42 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 42 may be associated with a power source or drivetrain of service vehicle 12, and configured to generate signals indicative of an amount of power used to propel service vehicle 12, to drive the hydraulics of actuators 26, to move the in-bed compactor, or to shut the associated door. Other types of sensors 42 (e.g., cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor (e.g., one or more microphones), an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 may alternatively or additionally be utilized. Signals generated by these sensors 42 may be communicated to onboard and/or offboard controllers 30, 32, and the appropriate controller may use the signals to determine conditions surrounding receptacles 14 (and/or the waste inside receptacles 14) during servicing by service vehicle 12. As described above, any one or more of sensors(s) 42 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive signals from locating device 38, input device(s) 40, and sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, and/or sensor(s) 42 via communication device 44, if desired. Other means of communication may also be possible.

Figure 3:
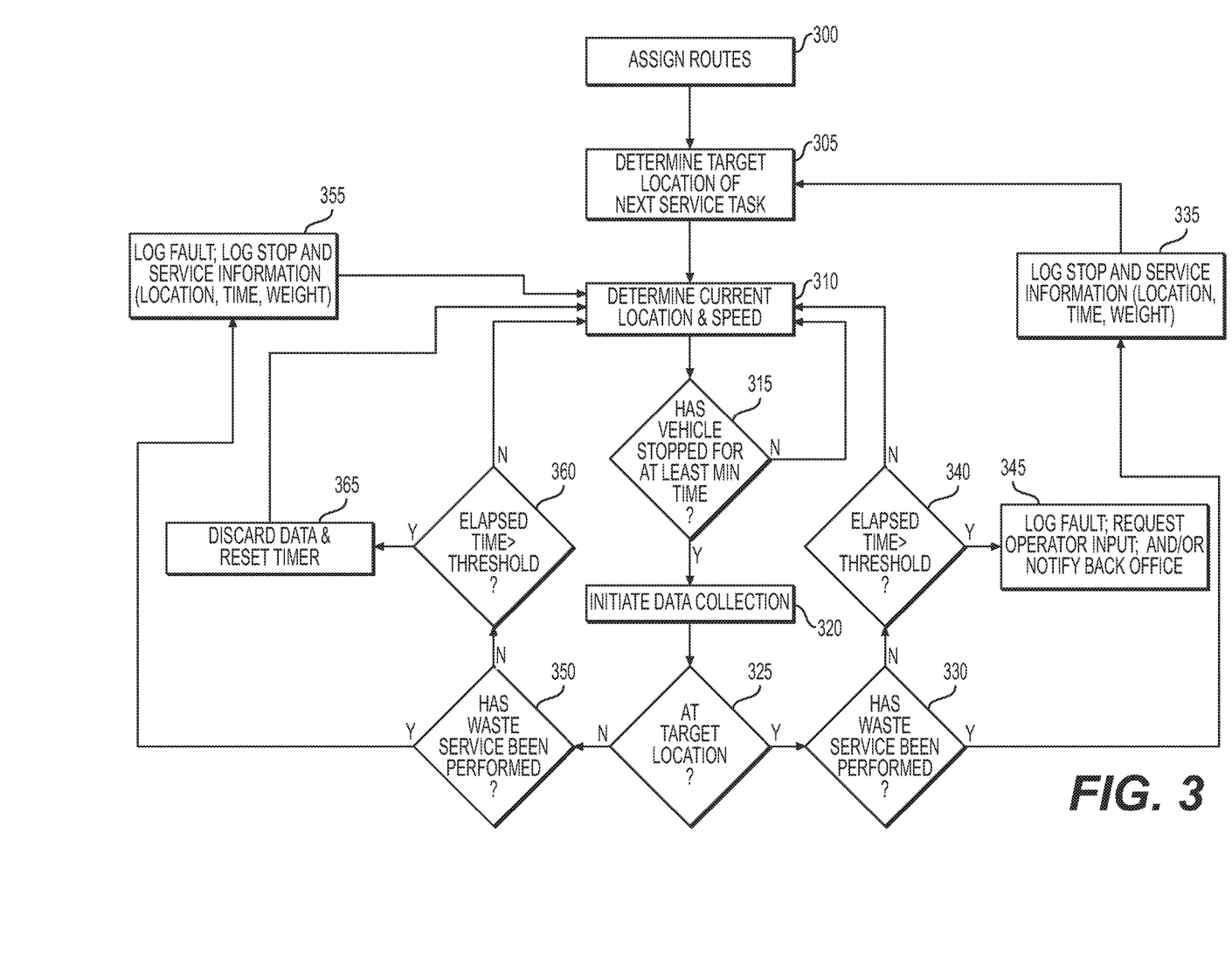
FIG. 3 is a flowchart depicting an exemplary disclosed method that may be performed by the system of FIG. 2.

Onboard and/or offboard controllers 30, 32, based on the information received from onboard service vehicles 12 and also based on information received from other sources (e.g., from the internet, from manual input at back office 34, etc.), can be configured to execute instructions stored on computer readable medium to perform methods of waste management at environment 10. For example, onboard and/or offboard controllers 30, 32 may be configured to monitor when service vehicle 12 is nearing a target location, when service vehicle 12 has stopped, when service vehicle 12 is servicing receptacle 14, etc. This monitoring may then be used to determine route assignments for service vehicle 12, determine business costs and efficiencies, determine service opportunities, make route adjustments, etc. An exemplary process is illustrated in FIG. 3, and will be explained in more detail in the following section to further illustrate the disclosed concepts.

FIGS. 4-8 represent exemplary Graphical User Interfaces (GUIs) that may be shown on any input device 40 or otherwise used to access system 36. FIGS. 4-8 will also be discussed in greater detail below to further illustrate the disclosed concepts.

INDUSTRIAL APPLICABILITY

The disclosed system may be applicable to the waste service industry, where efficiency and profitability are important. The disclosed system may enhance efficiency and profitability of a waste service provider by monitoring operations of individual service vehicles for unscheduled stops and/or services. Operation of system 36 will now be described with reference to FIG. 3.

As shown in FIG. 3, operation of system 36 may begin with the assignment of routes for each service vehicle 12 within the provider's fleet (Step 300). The route assignment of each service vehicle 12 may include a plurality of target locations arranged, for example, according to geographical location, type of customer, number and sizes of receptacles 14 at each customer location, a type of waste to be collected, a type of service vehicle 12, a size of service vehicle 12, and other similar factors. The target locations within each route may also be arranged in a particular order based on time, traffic conditions, anticipated vehicular speed, etc. The assignments may be made manually (e.g., by a manager at back office 34) or automatically (e.g., by onboard controller 30, offboard controller 32, and/or input device 40), and communicated to the operator of each service vehicle 12 by way of communication device 44. The communicated routes may then be stored, for example, within onboard controller 30 and/or within any one of input devices 40 (e.g., within a smartphone or tablet running a corresponding app).

The operator may follow the assigned route and service each target location of the route in the order provided. In particular, a target location listed next in the route may be automatically determined for the operator (Step 305). The target location determination may be made automatically, for example, by any of the computing device(s) (e.g., the app running within input device 40, onboard controller 30, and/or offboard controller 32) of system 36. For example, the determination can be based on a correlation between a current time and a time listed for service at each target location. Alternatively, the service vehicle operator could manually select a target location from the assigned route, if desired. Once the target location is relayed to and/or picked by the operator of a particular service vehicle 12, subsequent travel of service vehicle 12 toward the target location may be monitored. In particular, the current location and/or speed of service vehicle 12 may be tracked, for example by way of locating device 38 (Step 310).

During travel of service vehicle 12, any one or more of the computing device(s) of system 36 may determine if service vehicle 12 has stopped and/or stopped for at least a minimum amount of time (Step 315). Many different strategies may be used to determine if service vehicle 12 has stopped. In one example, the location signal alone may be used to make this determination, for example based on a change in location being less than a threshold amount within a specified period of time. Alternatively, a tracked speed being less than a threshold speed may be used to determine stopping of service vehicle 12. In another embodiment, a change in payload (e.g., weight and/or volume), as indicated via signals from sensors(s) 42, may indicate that service vehicle 12 is likely to be stopped. Stopping may also be determined in other ways.

The computing device(s) of system 36 may require service vehicle 12 to be stopped for at least a minimum amount of time, in some applications, to help filter out inconsequential stops, such as stops at traffic lights, stops caused by congestion or road work, etc. In one embodiment, the minimum amount of time is about 15-30 seconds. It should be noted, however that other minimum amounts of times may be used.

Other filters may additionally or alternatively be used to help filter out inconsequential stops during travel toward a target location, in some application. In particular, the traveled distance and/or speed may be used in conjunction with the location of service vehicle 12 to determine if the stop of service vehicle 12 is consequential. For example, when service vehicle 12 is determined to no longer be moving, but also located at a traffic light, on a freeway, at a road work location, etc., the stop may be determined to be part of normal travel toward the target location. As long as it is determined that service vehicle 12 is still traveling toward its target location (step 315:N), control may loop back through step 310.

However, when it is determined that service vehicle 12 has stopped for at least the minimum amount of time or is otherwise no longer following a travel path toward its target location (step 315:Y), data collection may be initiated (Step 320). The data collection may include, among other things, the collection of signals generated by sensor(s) 42. For example, a force, a strain, a motion, an image, and/or a sound associated with movement of lifting device 22, the in-bed compactor, the bed door, bed 16 itself, the waste inside bed 16, etc., may be captured. By collecting this data only when it is determined that service vehicle 12 has stopped for at least the minimum amount of time, an amount of collected data and a corresponding size of memory required to hold and/or process the data may be reduced. In addition to collecting data following completion of step 315, a current location of service vehicle 12 may be compared to the target location listed next in the assigned route to determine if the current stop occurred at the target location (Step 325). It should be noted that, although step 325 is shown in FIG. 3 as occurring after step 320, step 325 could alternatively occur before or at the same time as step 320.

When the stop of service vehicle 12 detected at step 315 is determined at step 325 to have occurred at the next target location of the route assigned to service vehicle 12, the computing device(s) of system 36 may determine if a waste service has been performed at that stop (Step 330). The waste service may include, among other things, the emptying of receptacle 14 into bed 16 at the target location, the offloading of receptacle 14, the on-loading of receptacle 14, etc.

The determination of whether the waste service has been performed may be made based on the data collected at step 320. In particular, if the collected data corresponds with forces, strains, motions, weight changes, volume changes, and/or sounds (e.g., acoustic signatures, frequency levels, etc.) normally experienced by service vehicle 12 during performance of typical waste services, it can be concluded that an expected waste service has been performed. Values of the forces, strains, motions, weights, volumes, and/or sounds normally experienced by service vehicle 12 during performance of the typical waste services may be stored in the memory of the computing device(s) of system 36 for comparison purposes.

When it is determined that a waste service has been performed at the target location, information associated with the stop and the service may be logged into system 36 (Step 335). As is known in the art, the logged information may then be used to update and bill the customer, to pay the service provider, to adjust future service routes, etc. Control may return to step 305 after completion of step 335, for determination of a next target location in the assigned route. It is contemplated that each time control returns to step 305 (and other times throughout the process of FIG. 3), the computing device(s) of system 36 may make adjustments to the assigned route based on time, traffic conditions, location, schedule restraints, etc., so as to optimize use of service vehicle 12.

However, when it is determined at step 330 that a waste service has not yet been performed, a time elapsed since service vehicle 12 stopped may be determined and compared to a threshold time (Step 340). As long as the elapsed time is less than the threshold time, control loop back through step 310. The threshold time used at step 340 may be an amount of time expected to elapse during a normal service event at the given location. In some embodiments, the threshold time may also include a buffer that accounts for minor unexpected delays or efficiency differences between operators and/or service vehicles 12. When it is determined at step 340 that the elapsed time exceeds the threshold time, any number of responses may be automatically implemented (Step 345). For example, a fault may be electronically logged into system 36 in association with the particular service vehicle 12, with the particular operator, with the particular location, etc.; the operator may be provided with an electronic notice (e.g., via input device 40) and/or a request for input explaining the delay; back office 34 may be electronically notified; etc. In one instance, in addition to the notice being provided to the operator of service vehicle 12, the operator may also be provided with selectable options to explain the delay such as, "report an incident", "equipment malfunction", "request help", "provide instructions", "stopped for fuel", "on break", etc.

Returning to step 325, when it is determined that the stop detected at step 315 is consequential and does not coincide with the target location of the next customer in the assigned route, control may proceed to a step 350 that is substantially identical to step 330 described above. That is, a determination may be made regarding performance of a waste service at the stop location, even though the stop location does not correspond with the target location of a subscribing customer. When it is determined that a waste service was made at the stop location (e.g., based on the data collected at step 320), the computing device(s) of system 36 may electronically log a fault and store corresponding information associated with the stop and the service performed while at the stop (Step 355).

In some embodiments, when the computing device(s) of system 36 determine that service vehicle 12 has made a consequential stop that is not at a target location of a subscribing customer, the computing devices(s) may be able to alert the operator before an improper waste service can be performed. For example, it may be possible for service vehicle 12 to stop (e.g., out of habit) at a location corresponding to a cancelled service subscription. Upon making the determination that the stop is consequential and that the location of the stop corresponds with an old address of a previously subscribing customer, the operator of service vehicle 12 may be alerted of the fact via input device 40. In some instances, this alert may cause the driver to abort the waste service with enough time to continue to the next target location in the assigned route.

Following step 355, control may return to step 310, allowing the operator of service vehicle to 10 continue the assigned route and travel to the target location of the next scheduled customer. In some embodiments, the computing device(s) of system 36 may additionally adjust the route (e.g., the consist and/or order) of the remaining target locations based on delays caused by the unscheduled stop, if desired. In yet other embodiments, the computing device(s) can also be configured to automatically assign one or more of any remaining waste-service tasks to another service vehicle 12 and operator (e.g., based on the other service vehicle's progress of a different assigned route), such that the delay caused by the unscheduled stop and service does not continue to impact the rest of the day's scheduled services. Any time the route for a particular a service vehicle 12 is adjusted (e.g., to accommodate the unscheduled stop and/or to transfer a target location to another service vehicle 12), the driver, back office, and or customer may be notified of the adjustment.

At step 350, when it is determined that a waste service has not yet been performed at the non-target location (e.g., based on the data captured at step 320), a time elapsed since the stop of service vehicle 12 may be determined and compared to a threshold time (Step 360). As long as the elapsed time is less than the threshold time, control may return to step 310. The threshold time used at step 360 may be the same or a different amount of time used at step 340, as desired. In some embodiments, the threshold time used at step 360 may be an amount of time normally required to perform a standard waste service that is less than an amount of time associated with other expected delays (e.g., a time for the operator to obtain and consume lunch) that are sometimes encountered during completion of the assigned route. When it is determined at step 360 that the elapsed time is greater than the threshold time, it can be concluded that the unscheduled stop is not associated with a service activity and the captured data may be discarded (Step 365). Control may then return from step 365 to step 310.

Figure 4:
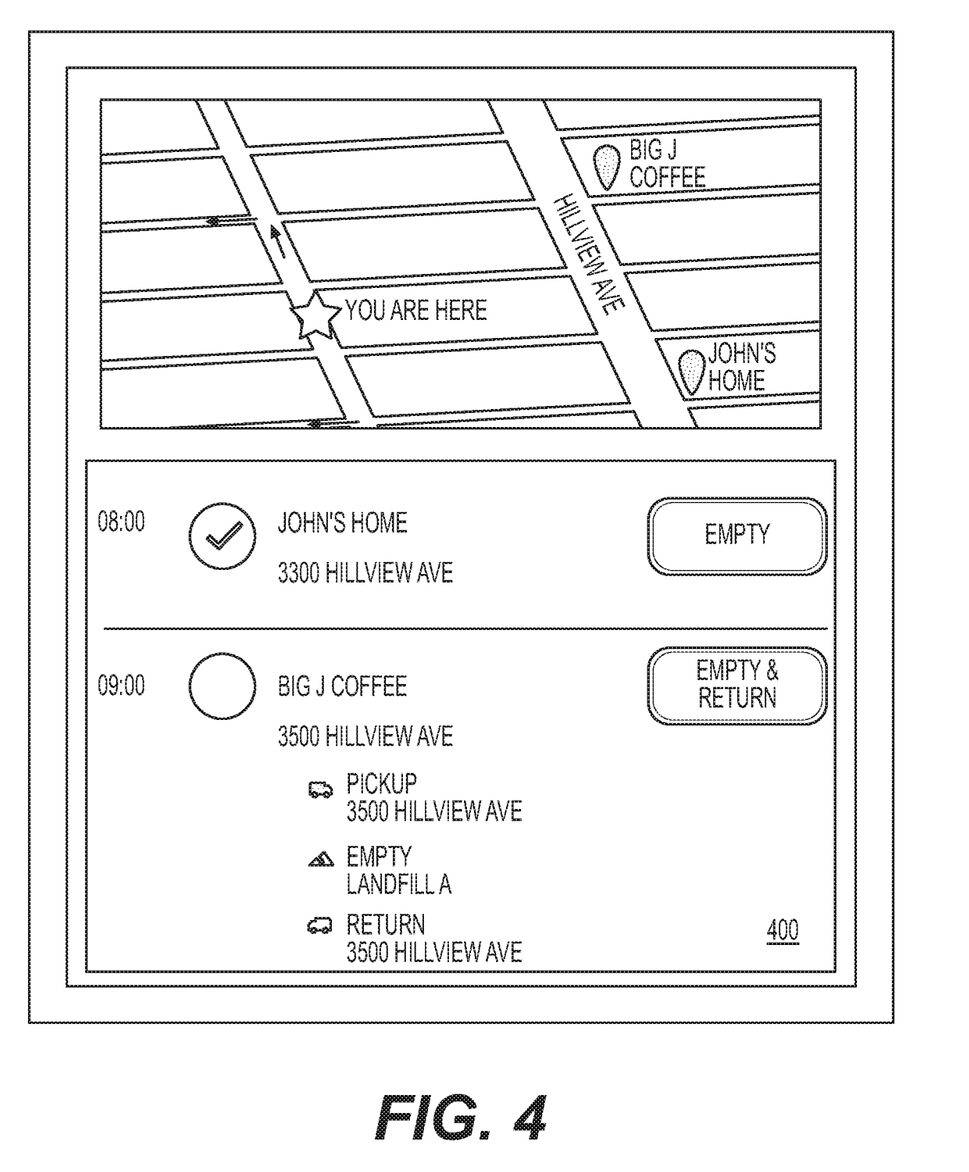
FIGS. 4-8 are diagrammatic illustrations of exemplary disclosed graphical user interfaces that may be used to access the system of FIG. 2.
Figure 5:
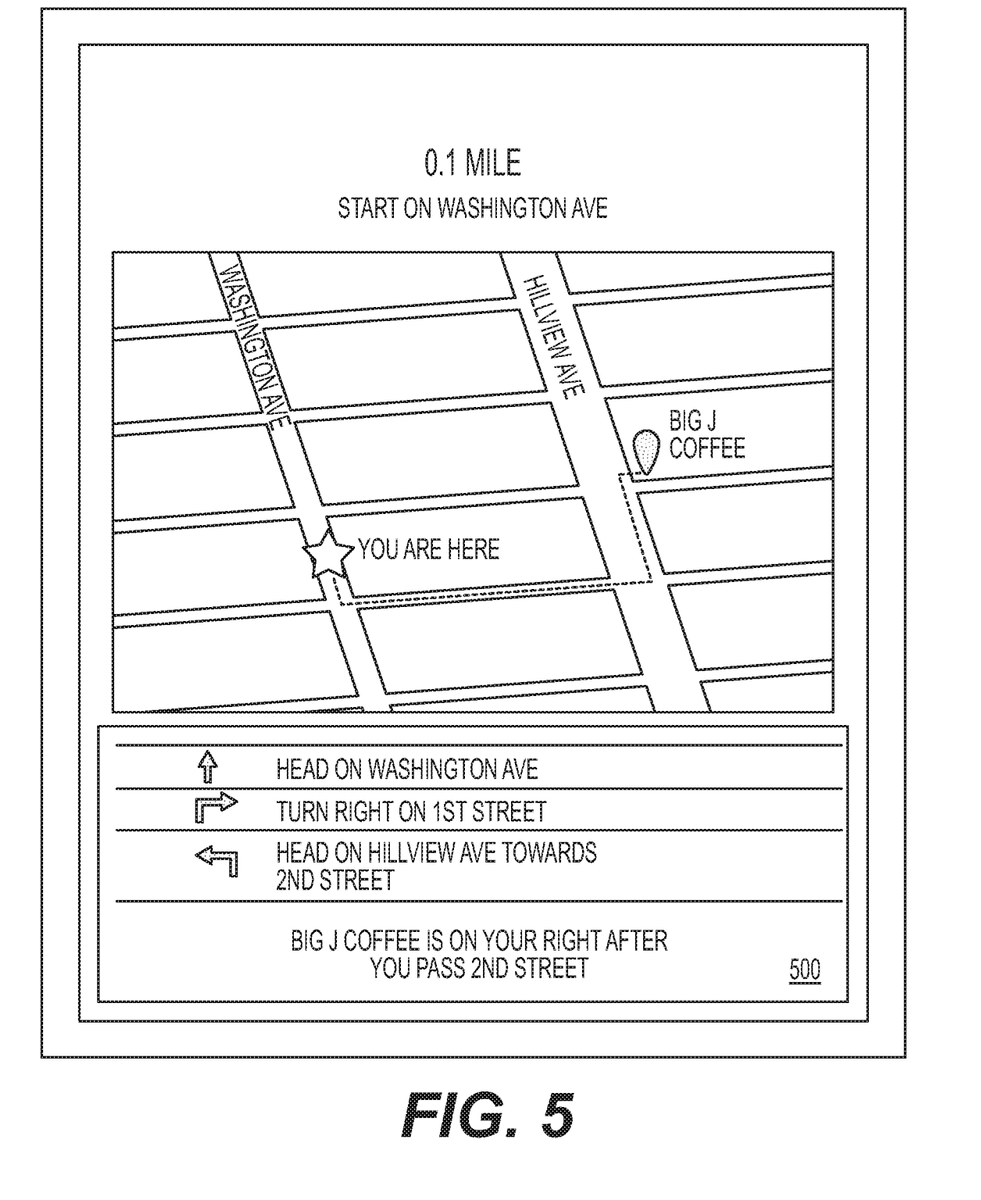

FIGS. 4 and 5 show exemplary GUIs 400 and 500, respectively, that may be used to facilitate the process that is described above and shown in FIG. 3. GUIs 400 and 500 (as well as the other GUIs of FIGS. 6-8) may be shown on any onboard input device 40 (referring to FIG. 2) and, as can be seen in FIGS. 4 and 5, may correspond with steps 300-310 in the flowchart of FIG. 3. In particular, via GUIs 400 and 500, the operator of service vehicle 12 may be provided with a visual representation of an assigned route. The representation may include a listing of target locations, along with an indication of which of the target locations have been visited and had services performed and a target location scheduled next for service. In addition, a map may be provided showing the target locations, along with a representation of a relative current location of service vehicle 12. Addresses and/or turn-by-turn directions may be provided, along with service instructions for each location. In some embodiments, the operator may be able to provide input during travel to and/or service at each location in the assignment. For example, the operator may be able to manually indicate arrival at a location, completion of the assigned waste service, and/or problems associated with service at the location.

Figure 6:
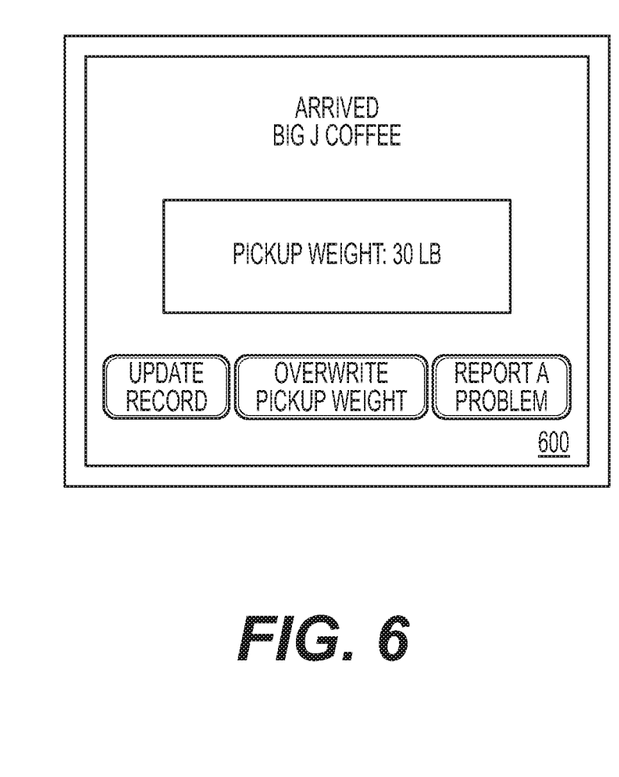
Figure 7:
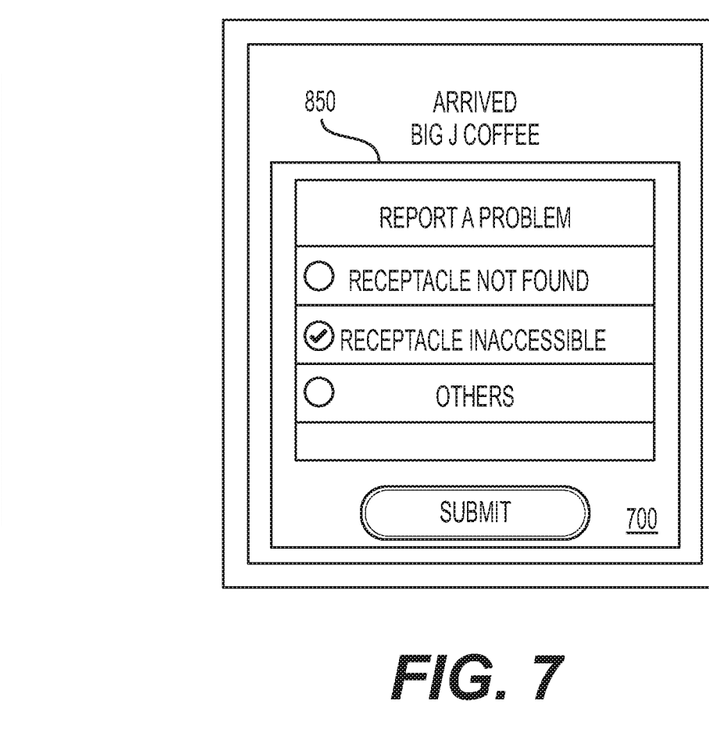

FIGS. 6 and 7 show exemplary GUIs 600 and 700 that may also be used to facilitate the process of FIG. 3. Specifically, GUIs 600 and 700 may correspond with steps 330-345 in the flowchart of FIG. 3, and provide an operator with information regarding a service performed at a customer location. The service information may include, for example, a weight and/or volume of the waste dumped from a corresponding receptacle 14 into bed 16 of service vehicle 12. GUI 600 may also provide the option for the operator to adjust the displayed information and/or to provide a reason for delayed servicing. For example, the operator may be able to update a record, overwrite a pickup weight or volume, and/or report a problem. Via GUI 700, the operator may then be able to provide details regarding any problem experienced when attempting to service receptacle 14.

Figure 8:
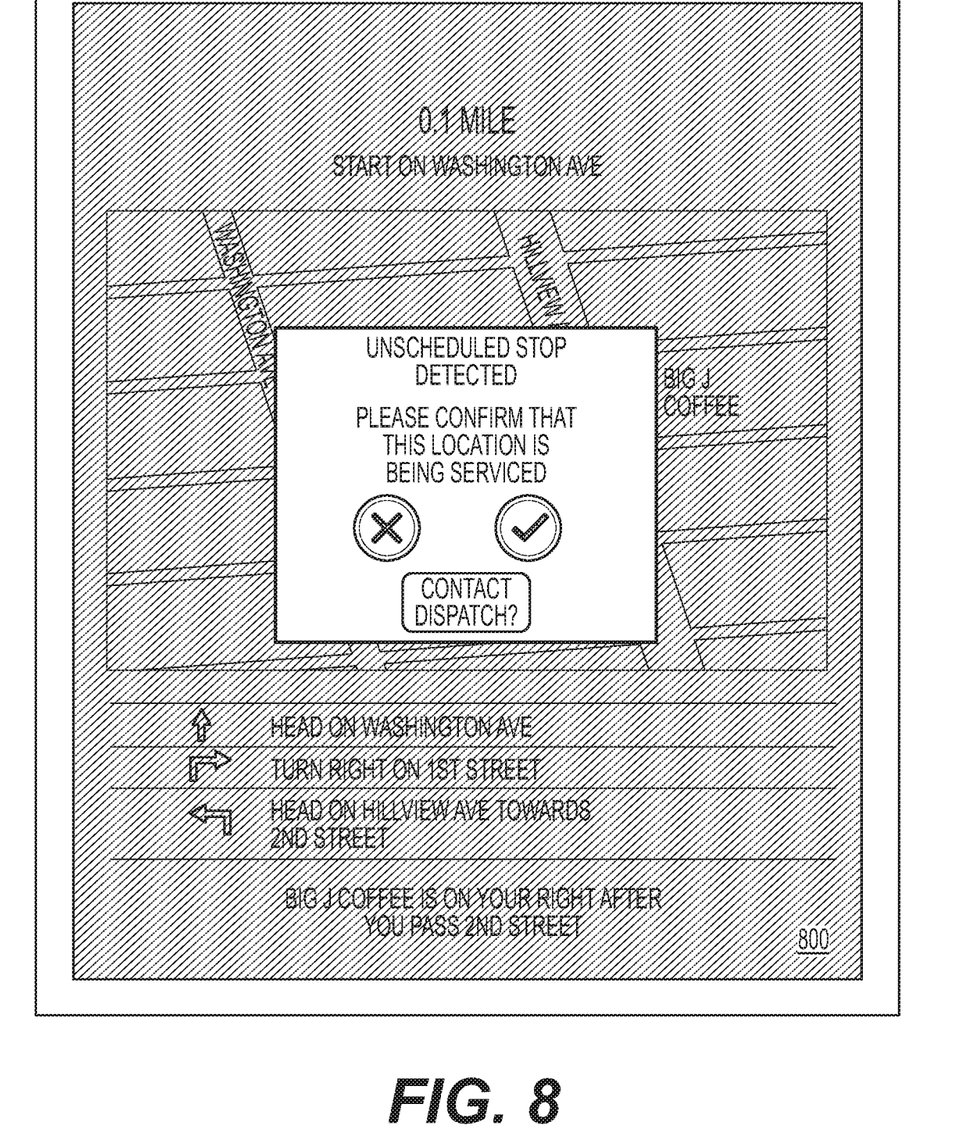

A final exemplary GUI 800 is shown in FIG. 8, and corresponds with steps 350 and 355. Specifically, after detection of an unscheduled stop and/or of performance of a waste service at the unscheduled stop, GUI 800 may appear on the display of input device 40. GUI 800 may include (e.g., in a background) the map and/or directions to the next scheduled stop in the assigned route. In addition, GUI 800 may include (e.g., in a foreground) a pop-up window notifying the operator that the unscheduled stop has been detected and asking the operator to confirm that service is being performed at the unscheduled stop. In some embodiments, back office 34 may be presented with a similar pop-up window, unscheduled stop list, or other GUI in response to the unscheduled stop being detected. These notifications may alert the operator and/or back office 34 of an error made by the operator in stopping and/or providing service at the current location. Remedial action (e.g., a dispatch call from back office 34) may then be taken.

The interfaces illustrated in FIGS. 4-8 are exemplary only and are provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. For example, it is contemplated that, in some instances, the stopping of service vehicle 12 may not need to be detected as part of the process shown in FIG. 3.

Instead, merely a detected change in weight or volume of material transported by service vehicle 12 may be monitored and used to determine if service vehicle 12 has made a stop. It is also contemplated that one or more of service vehicle(s) 12 could be autonomously controlled, if desired. It is intended that the specification and examples be considered as exemplary only, with a true scope being indicated by the following claims and their equivalents.

The disclosed system may provide tools that can be used to monitor and account for unscheduled stops and/or performance of waste services, regardless of the reasons for the stops and services. By detecting when an unscheduled stop has occurred and whether service has been provided in association with the stop, the stop may be accounted for financially and schedule-wise. In addition, adjustments to future operations based on the monitored stops and/or service may reduce a likelihood of future delays.

What is claimed is:

1. A system for automatically managing waste services performed by a first service vehicle, comprising:
   a locating device disposed onboard the first service vehicle and configured to generate a first signal indicative of a location of the first service vehicle;
   at least one sensor disposed onboard the first service vehicle and configured to generate a second signal indicative of one or more service actions and a type of service action being completed by the first service vehicle, the service actions including at least one of a receptacle being emptied into the first service vehicle, the receptacle being loaded onto the first service vehicle, or the receptacle being offloaded from the first service vehicle; and
   a computing device in communication with the locating device and the at least one sensor, the computing device being configured to:
   receive a service assignment comprising an assigned route including service actions to be performed by the first service vehicle at a plurality of target locations; and
   in response to determining that the first service vehicle, while remaining on the assigned route, has stopped based on at least the first signal for an amount of time greater than a threshold time that relates to an amount of required to perform a service action:
   begin collecting the second signal,
   determine that a first service action is performed based on at least the second signal,
   make a determination that the first service vehicle has stopped at a non-target location based on the location of the first service vehicle not corresponding to one of the plurality of target locations,
   generate an alert to an operator on a display of an input device based on the determination that the first service vehicle has stopped at the non-target location for more than the threshold time, and
   provide one or more options on the display of the input device selectable by the operator to respond to the alert with an explanation for stopping at the non-target location for more than the threshold time.

2. The system of claim 1, wherein the at least one sensor includes at least one of a lift sensor and an acoustic sensor.

3. The system of claim 1, wherein:
   at least one sensor disposed onboard the first service vehicle is further configured to generate a third signal indicative of a stoppage of the first service vehicle;
   the computing device is further configured to determine, based on at least the third signal and the first signal, that the first service vehicle is stopped.

4. The system of claim 1, wherein the computing device is configured to determine that the first service action has been performed based on a comparison of the second signal with known data corresponding to expected service actions normally performed by the first service vehicle.

5. The system of claim 1, wherein the first service vehicle is rerouted with a message to an operator of the first service vehicle, the message including a request for input from the operator confirming that the first service action was performed.

6. The system of claim 1, further comprising automatically rerouting a second service vehicle based on the rerouting of the first service vehicle.

7. The system of claim 1, wherein the computing device is further configured to selectively adjust an uncompleted remainder of the service assignment.

8. A method for automatically managing waste services performed by a first service vehicle, the method comprising:
   generating a first signal indicative of a location of the first service vehicle;
   generating a second signal indicative of one or more service actions and a type of service action being performed by the first service vehicle that includes at least one of a receptacle being emptied into the first service vehicle, the receptacle being loaded onto the first service vehicle, or the receptacle being offloaded from the first service vehicle;
   determining a service assignment comprising an assigned route and including waste services to be performed by the first service vehicle at a plurality of target locations; and
   in response to determining that the first service vehicle has stopped based on at least the first signal for more than a threshold time that relates to an amount of required to perform a service action:
   beginning collection of the second signal,
   determining that the first service vehicle has performed a first service action based on at least the second signal,
   determining that the first service vehicle has stopped at a non-target location based on the location of the first service vehicle not corresponding to one of the plurality of target locations;
   generating an alert to an operator on a display of an input device based on the determination that the first service vehicle has stopped at a non-target location for more than the threshold time, and
   providing one or more options on the display of the input device selectable by the operator to respond to the alert with an explanation for stopping at the non-target location for more than the threshold time.

9. The method of claim 8, further comprising:
   generating a third signal indicative of a stoppage of the first service vehicle; and
   determining that the first service vehicle has stopped based on at least the third signal and the first signal.

10. The method of claim 8, wherein generating the second signal indicative of a service action being completed includes generating the second signal indicative of at least one of a force, a motion, or a sound associated with a receptacle being dumped into or loaded onto the first service vehicle.

11. The method of claim 8, wherein determining that the first service action has been performed includes determining that the first service action has been performed based on a comparison of the second signal with known data corresponding to expected service actions normally performed by the first service vehicle.

12. The method of claim 8, wherein collecting the second signal includes collecting the second signal only when the first service vehicle is determined to have been stopped for an amount of time greater than a threshold time.

13. The method of claim 8, wherein first service vehicle is rerouted with a message, the message including a request for input from an operator confirming that the first service action was performed.

14. The method of claim 8, further comprising automatically rerouting a second service vehicle based on the rerouting of the first service vehicle.

15. The method of claim 8, further including selectively adjusting an uncompleted remainder of the service assignment.

16. A non-transitory computer readable medium containing computer-executable programming instructions for automatically performing a method of waste management by a first service vehicle, the method comprising:
generating a first signal indicative of a location of the first service vehicle;
generating a second signal indicative of one or more service actions and a type of service action being completed by the first service vehicle that includes at least one of a receptacle being emptied into the first service vehicle, the receptacle being loaded onto the first service vehicle, or the receptacle being offloaded from the first service vehicle;
determining a service assignment comprising an assigned route and including waste services to be performed by the first service vehicle at a plurality of target locations; and
in response to determining that the first service vehicle has stopped based on at least the first signal for more than a threshold time that relates to an amount of required to perform a service action:
beginning collection of the second signal,
determining that the first service vehicle has performed a first service action based on at least the second signal,
determining that the first service vehicle has stopped at a non-target location based on at least the first signal and based on at least the first signal and based on the location of the first service vehicle not corresponding to one of the plurality of target locations;
generating an alert to an operator on a display of an input device based on the determination that the first service vehicle has stopped at a non-target location for more than the threshold time, and
providing one or more options on the display of the input device selectable by the operator to respond to the alert with an explanation for stopping at the non-target location for more than the threshold time.

17. The system of claim 1, further comprising:
a second locating device configured to generate a third signal indicative of a location of the first service vehicle,
wherein the computing device is further configured to, when the computing device determines that the first service vehicle has stopped, make a determination that the first service vehicle has stopped at a non-target location based on the plurality of target locations and on at least the third signal and first signal.

18. The system of claim 17, further comprising automatically rerouting a second service vehicle based on the rerouting of the first service vehicle.

19. The system of claim 1, wherein the computing device is configured to automatically reroute the first service vehicle based on the determination that the first service vehicle has stopped at a non-target location and on the determination that the first service vehicle has performed the first service action.

20. The system of claim 19, wherein the computing device is configured to assign one or more remaining waste-service tasks to another service vehicle to avoid having a delay caused by an unscheduled stop and service from impacting other scheduled services.

21. The system of claim 1, wherein the computing device is configured to:
identify that the non-target location corresponds with an old address of a previously subscribing customer; and
generate the alert to an operator of the first service vehicle indicating that the non-target location corresponds to a canceled service subscription before an improper waste service is performed.

\* \* \* \* \*